United States Patent [19]
McAllister

[11] Patent Number: 6,104,913
[45] Date of Patent: Aug. 15, 2000

[54] PERSONAL AREA NETWORK FOR PERSONAL TELEPHONE SERVICES

[75] Inventor: Alexander I. McAllister, Silver Spring, Md.

[73] Assignee: Bell Atlantic Network Services, Inc., Arlington, Va.

[21] Appl. No.: 09/038,100

[22] Filed: Mar. 11, 1998

[51] Int. Cl.$^7$ ..................................................... H04B 5/00
[52] U.S. Cl. ................... 455/41; 340/825.31; 379/93.03
[58] Field of Search ............................. 455/41, 415, 414, 455/412, 556, 557, 558, 433; 379/93.02, 93.03, 93.04, 200, 245, 357, 714; 380/49, 25; 340/825.31–825.35

[56] References Cited

U.S. PATENT DOCUMENTS

| | | | |
|---|---|---|---|
| 4,680,785 | 7/1987 | Akiyama et al. | 455/31.2 |
| 4,876,717 | 10/1989 | Barron et al. | 380/25 |
| 5,329,578 | 7/1994 | Brennan et al. . | |
| 5,430,791 | 7/1995 | Feit et al. . | |
| 5,465,290 | 11/1995 | Hampton et al. . | |
| 5,497,411 | 3/1996 | Pellerin | 455/411 |
| 5,515,426 | 5/1996 | Yacenda et al. . | |
| 5,572,583 | 11/1996 | Wheeler, Jr. et al. . | |
| 5,586,177 | 12/1996 | Farris et al. . | |
| 5,611,051 | 3/1997 | Pirelli | 705/10 |
| 5,661,791 | 8/1997 | Parker . | |
| 5,675,628 | 10/1997 | Hokkanen | 455/433 |
| 5,701,121 | 12/1997 | Murdoch | 340/825.54 |
| 5,719,921 | 2/1998 | Vysotsky et al. . | |
| 5,761,290 | 6/1998 | Farris et al. . | |
| 5,825,865 | 10/1998 | Oberlander et al. . | |
| 5,914,701 | 6/1999 | Gersheneld et al. | 345/156 |

OTHER PUBLICATIONS

WiSAP: a wireless personal access network for handheld computing devices Bisdikian, C.; Bhagwat, P.; Gaucher, B.P.; Janniello, F.J.; Naghshineh, M.; Pandoh, P.; Korpeoglu, I. IEEE Personal Communications vol.: 5 6, Dec. 1998, pp. 18–25.

Personal Communications in the Intelligent Network R. De Sadaba. British Telecommunications Engineering, vol. 9, Aug. 1990 pp. 80–83.

Zimmerman, T. G., "Personal Area Networks: Near–field intrabody communication", IBM Systems Journal, vol. 35, No. 3 & 4, 1996–MIT Media Lab.

"The Personal Area Network: Are you read for prosthetic memory?", IBM lead story: The Personal Area Network—Microsoft Internet Explorer, IBM Corporation.

"PAN Fact Sheet—Hi–Tech, Hi–Touch Personal Area Networks (PAN): A Technology Demonstration by IBM Research", User System Ergonomics Research, Nov. 18–19, 1996.

*Primary Examiner*—Dwayne D. Bost
*Assistant Examiner*—Charles Craver
*Attorney, Agent, or Firm*—McDermott, Will & Emery

[57] ABSTRACT

A personal area network (PAN) device enables the communication of data using galvanic properties of the skin. A person can wear a processor coupled to a PAN device. When the person touches a sensor capable of communicating with the PAN, the processor sends and receive data through the PAN and the sensor. In accord with the invention, the processor stores personal information related to the wearer's telephone service, such as the person's identification and billing information. The processor also may store information relating to the person's telephone subscriber profile, defining that person's individualized telephone services. When the wearer touches a sensor on a pay telephone, the processor supplies the data through the PAN and the sensor to a processor in the telephone. The telephone communicates the data through the telephone network, to enable the network to provide personalized services. For example, the network uses the billing information to bill any calls that the person makes to the person's normal telephone account, in a manner analogous to a credit card type billing procedure. A feature of the invention is that virtually positive identification of a person is implemented preferably using biometric characteristics of the actual caller.

9 Claims, 9 Drawing Sheets

PERSONAL AREA NETWORK FOR PERSONAL TELEPHONE SERVICES

CROSS-REFERENCE TO RELATED APPLICATIONS

This application is related to U.S. patent application Ser. No. 09/006,033, filed Jan. 12, 1998, the disclosure of which is incorporated by reference herein in its entirety.

TECHNICAL FIELD

The present invention relates to a personal area network (PAN) device operated in a new manner in conjunction with an advanced telephone network to provide enhanced telephone services through the communication of data using subscriber borne devices and near electrostatic field communication phenomena.

ACRONYMS

The written description uses a large number of acronyms to refer to various services, messages and system components. Although generally known, use of several of these acronyms is not strictly standardized in the art. For purposes of this discussion, acronyms therefore will be defined as follows:

Address Complete Message (ACM)
Advanced Intelligent Network (AIN)
ANswer Message (ANM)
Automatic Number Identification (ANI)
Call Processing Record (CPR)
Central Office (CO)
Common Channel Interoffice Signaling (CCIS)
Data and Reporting System (DRS)
Destination Point Code (DPC)
Generic Data Interface (GDI)
Initial Address Message (IAM)
Integrated Service Control Point (ISCP)
Integrated Services Digital Network (ISDN)
ISDN User Part (ISDN-UP)
Intelligent Peripheral (IP)
Line Identification Data Base (LIDB)
Multi-Services Application Platform (MSAP)
Office Equipment (OE)
Origination Point Code (OPC)
Personal Area Network (PAN)
Personal Communications Service (PCS)
Plain Old Telephone Service (POTS)
Point in Call (PIC)
Personal Identification Number (PIN)
Primary Rate Interface (PRI)
Public Switched Telephone Network (PSTN)
Service Control Point (SCP)
Service Creation Environment (SCE)
Service Management System (SMS)
Service Switching Point (SSP)
Signaling System 7 (SS7)
Signaling Point (SP)
Signaling Transfer Point (STP)
Simplified Message Desk Interface (SMDI)
Speaker Identification/Verification (SIV)
Terminating Attempt Trigger (TAT)
Time Slot Interchange (TSI)
Traffic Service Position System (TSPS)
Transaction Capabilities Applications Part (TCAP)
Transmission Control Protocol/Internet Protocol (TCP/IP)

BACKGROUND ART

In 1996 T. G. Zimmerman reported work on a Personal Area Network for enabling near-field intrabody commnication. IBM Systems Journal, Vol. 35, No. 3&4, 1996-MIT Media Lab, 0018-8670/96© IBM, Personal Area Networks: Near-field Intrabody Communication. That article is hereinafter excerpted and is incorporated by reference herein in its entirety. The initially conceived function of the network was to enable body carried electronic devices, such as cellular phones, personal digital assistants (PDAs), pocket video games, and pagers, to share data. The concept of Personal Area Networks (PANs) was stated to demonstrate how electronic devices on and near the human body can exchange digital information by capacitively coupling picoamp currents through the body. A low-frequency carrier (less than 1 megahertz) is used so no energy is propagated, minimizing remote eavesdropping and interference by neighboring PANs. A prototype PAN system allows users to exchange electronic business cards by shaking hands. Using a small transmitter approximately the size of a deck of cards embedded with a microchip, and a slightly larger receiving device, it is possible to transmit a pre-programmed electronic business card between two people via a simple handshake.

The natural salinity of the human body makes it an excellent conductor of electrical current. PAN technology takes advantage of this conductivity by creating an external electric field that passes a very small current through the body, over which data is carried. The current used is one-billionth of an ampere (one nanoamp), which is lower than the natural currents already in the body. The speed at which the data is transmitted is equivalent to a 2400 baud modem. Theoretically 400,000 bits per second could be communicated using this method.

The original researchers reportedly envisioned PAN technology as initially being applied in three ways:

To pass simple data between electronic devices carried by two human beings, such as an electronic business card exchanged during a handshake.

To exchange information between personal information and communications devices carried by an individual, including cellular phones, pagers, personal digital assistants (PDAs) smart cards. For example, upon receiving a page, the number could be automatically uploaded to the cellular phone, requiring the user to simply hit the "send" button.

To automate and secure consumer business transactions. Among the examples proffered by the developers:

A public phone equipped with PAN sensors would automatically identify the user, who would no longer have to input calling card numbers and PINs.

By placing RF (radio frequency) sensors on products, such as rental videos, stores could essentially eliminate counter lines and expedite rentals and sales. The customer would simply carry the selected videos through a detecting device that would automatically and accurately identify the customer and his selections, and then bill his account accordingly.

Health service workers could more safely and quickly identify patients, their medical histories and unique medicinal needs by simply touching them. This application would be particularly helpful in accident situations or where the patient is unable to speak or communicate.

Near-field PAN devices can operate at very low frequencies (0.1 to 1 megahertz) that can be generated directly from inexpensive microcontrollers. For example, the prototype PAN transmitter operated at 330 kilohertz (KHz) at 30 volts with a 10-picofarad electrode capacitance, consuming 1.5 milliwatts discharging the electrode capacitance. A majority of the energy is conserved or recycled using a resonant inductance-capacitance (LC) tank circuit. The PAN is based on the seven-layer ISO 7498 network standard and concerns the physical, second, and third layers.

FIG. 1 shows a PAN transmitter communicating with a PAN receiver. Both devices are battery powered, electrically isolated, and have a pair of electrodes. The PAN transmitter capacitively couples a modulating picoamp displacement current through the human body to the receiver. The return path is provided by the earth ground, which includes all conductors and dielectrics in the environment that are in close proximity to the PAN devices. The earth ground needs to be electrically isolated from the body to prevent shorting of the communication circuit.

In FIG. 2 the PAN transmitter is modeled as an oscillator, and the receiver is modeled as a differential amplifier. The basic principle of a PAN communication channel is to break the impedance symmetry between the transmitter electrodes and receiver electrodes. The transmitter's and receiver's intraelectrode impedances are ignored since the former is a load on an ideal voltage source and the latter is modeled as an open circuit. The four remaining impedances are labeled A, B, C, and D.

The circuit is rearranged to show how PAN device communication works by breaking the symmetry between the four electrodes. The circuit is a Wheatstone bridge where any imbalance of the relationship A/B=C/D will cause a potential across the receiver. Since the ratios must be exactly equal in order to null the circuit, and body-based PAN devices are constantly in motion, there will nearly always be an electrical communication path, as long as the receiver is sensitive enough to detect the imbalance.

A more detailed electrical model is derived by identifying all the electric field paths in the system. Electric fields exist between bodies at different potentials. FIG. 3 illustrates an electric field model of a PAN transmitter T communicating with a PAN receiver R. A small portion of the electric field G reaches the receiver R.

The transmitter T electrode closest to the body tb has a lower impedance to the body than the electrode facing toward the environment te. This enables the transmitter T to impose an oscillating potential on the body, relative to the earth ground, causing electric fields A, B, C, D, and E.

Similarly the impedance asymmetry of the receiver electrodes (rb and re) to the body and environment allow the displacement current from electric fields F and G to be detected. Since the impedance between the receiver electrodes is nonzero, a small electric field H exists between them.

The electric fields model is used to produce the electric circuit shown in FIG. 4. Some typical component values are shown for watch-based PAN devices. Referring to FIG. 3, the transmitter T capacitively couples to receiver R through the body (modeled as a perfect conductor). The earth ground provides the return signal. The circuit reveals that body capacitance to the environment E degrades PAN communication by grounding the potential that the transmitter T is trying to impose on the body.

The circuit model also suggests that feet are the best location for PAN devices, providing large electrodes in close proximity to the body and environment, respectively. This is particularly true for the environment electrode (te or re), which is the weakest link (largest impedance) in the circuit. The location also suggests a novel power source, i.e. PAN devices embedded in shoe inserts that extract power from walking. An adult dissipates several hundred milliwatts while walking. A piezoceramic pile charging a capacitor at an efficiency as low as 10 percent can provide enough power for a PAN device.

PAN devices can take the shape of commonly worn objects, such as watches, credit cards, eyeglasses, identification badges, belts, waist packs, and shoe inserts. Head-mounted PAN devices can include headphones, hearing aids, microphones, and head-mounted displays. Shirt pocket PAN devices may serve as identification badges. The wristwatch is a natural location for a display, microphone, camera, and speaker. A waist pouch can carry a PDA, cellular phone, keypad, or other devices that are large and heavy. PAN devices incorporating sensors can provide medical monitoring for such bodily functions as heartbeat, blood pressure, and respiratory rate. Pants pockets are a natural location for wallet-based PAN devices to store information and identify the possessor. Shoe inserts can be self-powered and provide a data link to remote PAN devices located in the environment, such as workstations and floor transponders that detect the location and identity of people.

The −3 dB bandwidth of the prototype PAN receiver is 400 KHz (100 KHz to 500 KHz), resulting in a maximum channel capacity of 417 kilobits (Kbits) per second, assuming a robust signal-to-noise ratio of 10. The PAN transceiver prototype implements a 2400 bits-per-second modem.

A PAN prototype was developed to demonstrate the digital exchange of data through a human body using battery-powered low-cost electronic circuitry. The detector is a current amp (gain=106) followed by an analog bipolar chopper controlled by a digital microcontroller, as shown in FIG. 4. The detector synchronously integrates the tiny received displacement current (e.g., 50 picoamperes, 330 KHz) into a voltage that can be measured by a slow, low-resolution analog-to-digital converter (50 KHz, 8 bits) provided by the microcontroller. The PAN transceiver uses five off-the-shelf components. The analog components and microcontroller can be combined into a single CMOS (complementary metal-oxide semiconductor) integrated circuit to produce a low-cost integrated PAN transceiver.

The transmitter is an LC tank (Q=6) made from a surface-mount inductor and the inherent electrode capacitance. The resonant tank circuit produces a clean sine wave output from a square wave input, minimizing RF harmonics, and boosts the output voltage in proportion to the Q of the tank. The transmit voltage can also be digitally programmed by varying the pulse width of the driving square wave. The integrator is discharged after every message bit (integrate-and-dump filtering) to minimize intersymbol interference.

Two modulation strategies were examined for PAN communication: on-off keying and direct sequence spread spectrum. On-off keying turns the carrier on to represent a message bit one and turns the carrier off for a message bit zero. The signal-to-noise performance is improved by increasing the transmit voltage. Direct sequence spread spectrum modulates the carrier with a pseudonoise (PN) sequence, producing a broadband transmission much greater than the message bandwidth. Symbol-synchronous PN modulation is used where a message bit one is represented by transmitting the entire PN sequence, and a message bit zero is represented by transmitting the inverted PN sequence. The signal-to-noise performance increases with the length of the PN sequence.

The prototype hardware was capable of detecting either on-off keying or direct sequence spread spectrum, determined by microcontroller coding. For on-off keying the bipolar chopper switches are driven at the carrier frequency, and the integrated result is compared to a fixed threshold to determine the value of the message bit. Quadrature detection is implemented by performing two sequential integrations, at 0 and 90 degrees phase, for each message bit. For spread spectrum the switches are driven by the PN sequence, and the integrated result, which is the correlation, is compared to two thresholds. If the correlation is greater than a positive threshold, the message bit is one. If the correlation is less than a negative threshold, the message bit is zero. If the correlation is between these thresholds (the dead zone), no message bit is received.

Once the message has been successfully received and demodulated, the microcontroller transmits the message to a host computer over an optical link (not shown), which electrically isolates the transceiver allowing evaluation and debugging independent of an electrical ground reference.

The demonstration prototype of the PAN system consisted of a battery-powered transmitter and receiver, and a host computer running a terminal program. The PAN prototypes measure 8×5×1 centimeters, about the size of a thick credit card. The transmitter contains a microcontroller that continuously transmits stored ASCII characters representing an electronic business card. The devices are located near the feet, simulating PAN shoe inserts. When the persons communicating are in close proximity, particularly when they shake hands, an electric circuit is completed, allowing picoamp signals to pass from the transmitter through one body, to the other body, to the receiver, and back through the earth ground. ASCII characters are sent to the receiver, demodulated, and sent via serial link to the host computer where they are displayed. Thus, when the subjects shake hands, one downloads his or her electronic business card to the other.

This PAN development provides a personal area network (PAN) device and system which is capable of transferring data from body to body through touch contact or mere close proximity. Available publications regarding the development suggest a number of areas of potential application. Among these is the automation and securing of consumer business transactions. One suggestion is a public phone equipped with PAN sensors which could automatically identify the user, who would no longer have to input calling card numbers and PINs. It is stated that this application would significantly reduce fraud and make calling easier and more convenient for users.

While this mode of using the personal area network or PAN devices would provide an improvement in the convenience of using public phones and would contribute to fraud reduction, it does not address the serious problem which is encountered in the case of a lost or stolen credit card in the possession of an unauthorized person. The suggested PAN technique would verify the card (PAN device) and any PIN contained within the PAN device. However this PAN technique would do nothing to cope with the problem posed by an individual in wrongful possession of the PAN and its data contents. In addition, the proposed application of the personal area network development to telecommunications does not extend beyond the limited identification function expressed.

DISCLOSURE OF THE INVENTION

The present invention addresses the above noted limitations and provides advances over existing technology and over the published suggestions for application of the personal area network development. Thus, it is one feature of the invention to utilize PAN devices in such a manner as to eliminate any question as to whether or not a caller or user with an authentic PAN device is the rightful or authorized possessor of that device. The invention further provides multiple arrangements whereby PAN devices enable new personalized and other advanced telecommunication services.

In the above identified related copending applications of the assignee of the present application there are described various techniques for providing new and improved telecommunication service in a personalized fashion. These techniques generally utilize profile data associated with identified persons, rather than profile data associated with a particular telephone number or a particular communication link or subscriber line. In many of the preferred service applications, the network uses a virtual office equipment number assigned to a subscriber's profile data to retrieve the data for providing a specific service, reducing or eliminating the need for assignment of additional telephone numbers. In certain instances this retrieval involves a location and transfer of significant amounts of data and not insignificant processing.

According to one feature of the present invention these new procedures are further enhanced by the subscriber carrying a PAN device which stores therein the profile and other data relating to the subscriber. This profile and data are then utilized by the subscriber to initiate personalized telephone services at any PAN equipped telephone. Positive subscriber identification is virtually assured. In addition the telephone services are implemented largely through local plant or equipment, i.e. the local switching system environment. By way of example, such a roaming subscriber may obtain the personalized service to which he subscribes by downloading his profile and any necessary related data by body contact or other proximity coupling to a sensor provided at public telephones such as pay phones. According to the invention these telephones need not be of a particular type inasmuch as the necessary processes are performed by the local equipment, plant, or switching system environment to which that telephone is connected. This feature permits the new service to be provided without regard to the fact that the toll telephones in the area may be owned by various entities and may constitute instruments of varying types and capabilities. The near field sensing and detecting device need not be provided as an integral part of a telephone or other terminal but may be separately mounted. In this manner it is unnecessary to make any change to the terminal itself.

Another feature of the invention provides positive authentication of the person utilizing the PAN device. This embodiment obviates the ambiguity presented where the PAN device falls into the possession of persons other than the user, and provides a significantly higher degree of fraud protection. This identification is preferably implemented through the use of voice authentication. Appropriate voice templates of the subscriber are stored in the PAN device and downloaded into the local telephone network through any PAN equipped telephone. The downloaded templates are then processed in the local telephone network to identify the person in possession of the PAN device. In this manner it is possible to virtually eliminate the problem of the PAN device being fraudulently used by one other than the person who created the templates.

The invention includes a methodology wherein a subscriber bearing a near field electric electrostatic field generating and receiving device approaches a stationary near field electric field receiving device which is connected to a communications network so as to establish a coupling between the near field devices. When this coupling is established there is a transfer of data signals and an identification of one or more biometric characteristics of the subscriber.

The invention further provides a subscriber borne and coupled transceiver generating and receiving near-field electric field signals and having data storage and a stationary transceiver generating and receiving near-field electric field signals and having data storage and coupled to a link to a switching system switching system in a telecommunication network, wherein the subscriber borne transceiver has stored therein data characterizing the identity of the subscriber, and the network contains control processors which respond to the subscriber coupling the transceivers together through currents carried by the body of said person to identify the subscriber.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

BEST MODE FOR CARRYING OUT THE INVENTION

Figure 1:
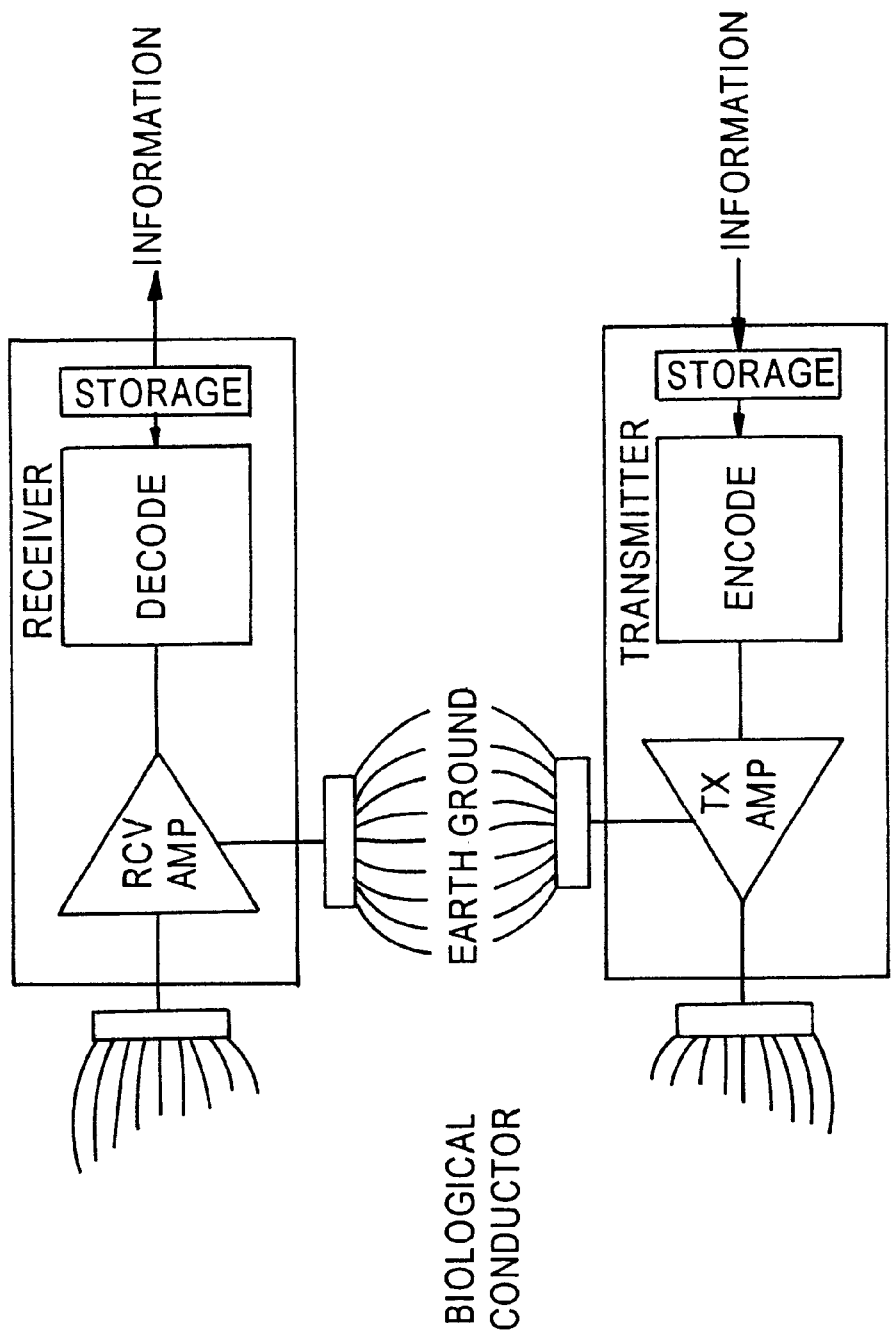
FIG. 1 shows a diagrammatic depiction of a PAN transmitter communicating with a PAN receiver.
Figure 2:
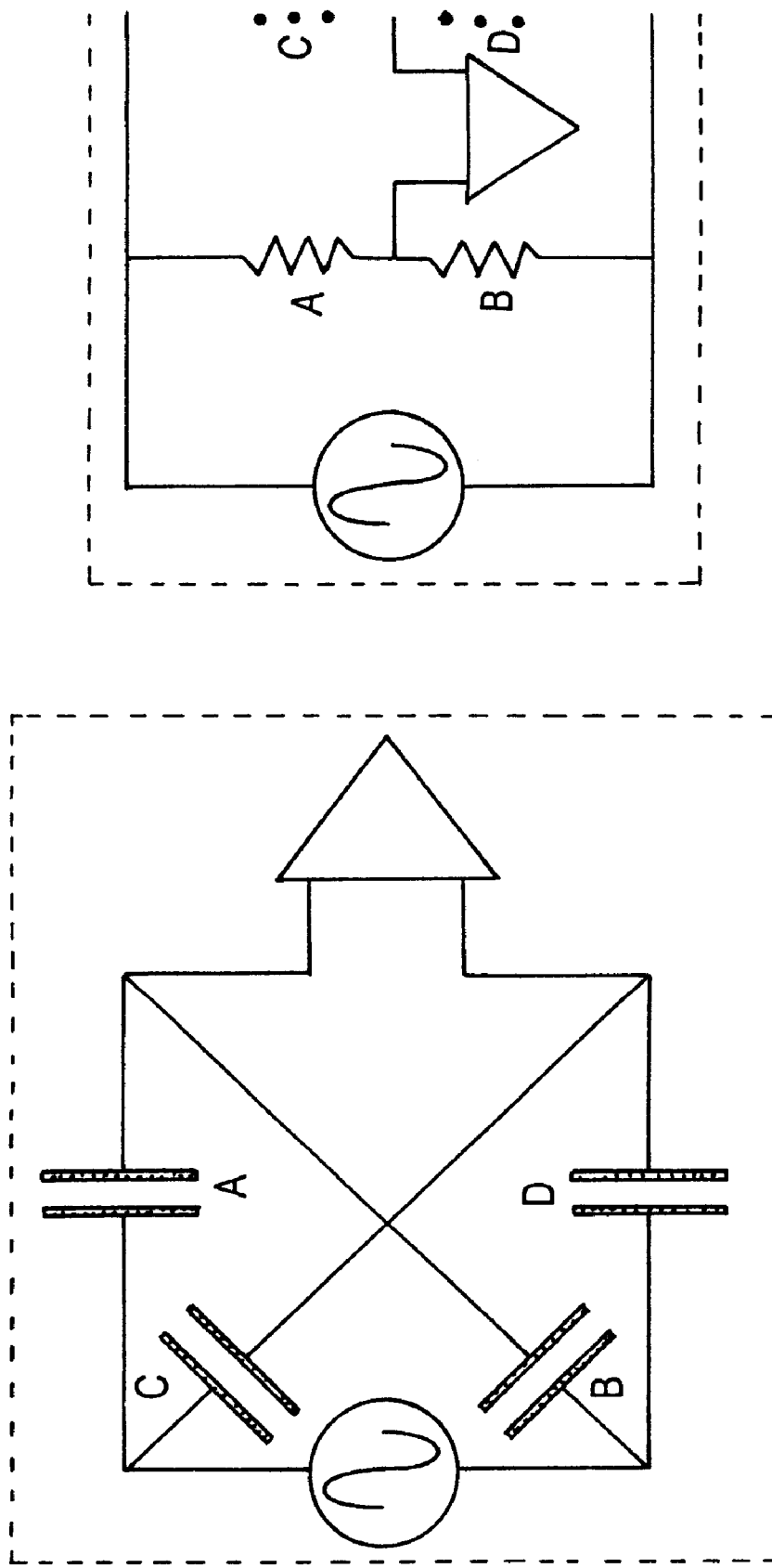
FIG. 2 depicts the circuitry rearranged to show how the PAN device communication works by breaking the symmetry between the four electrodes.
Figure 3:
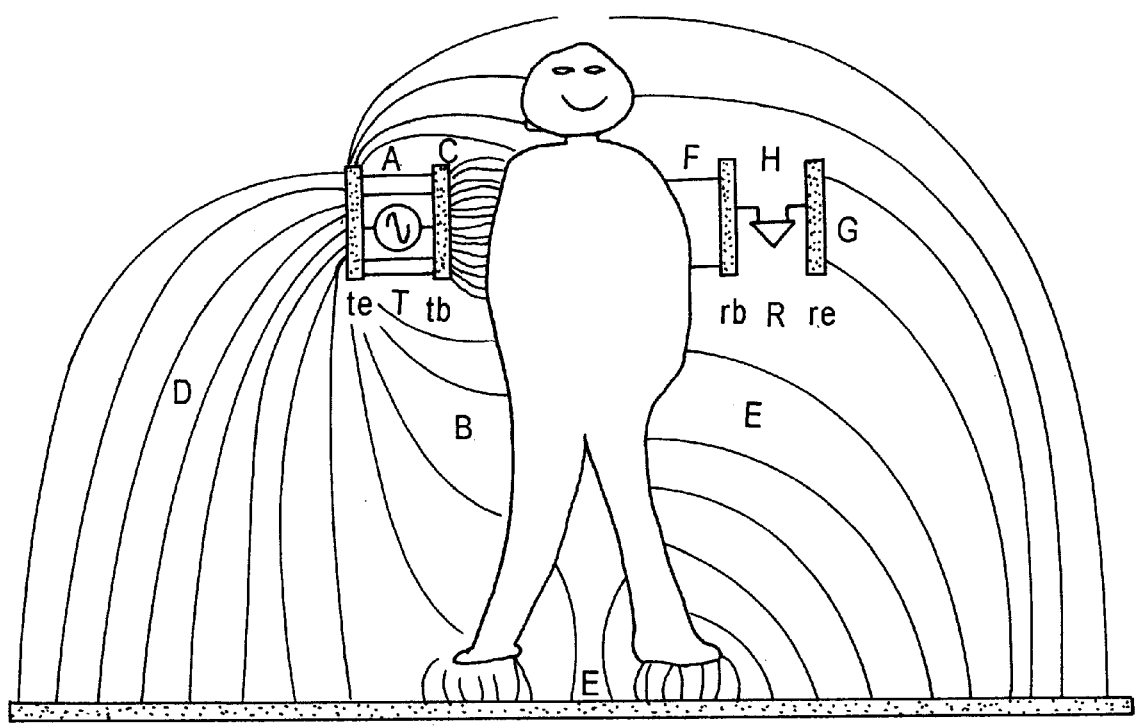
FIG. 3 illustrates the electrical field paths in the system.
Figure 4:
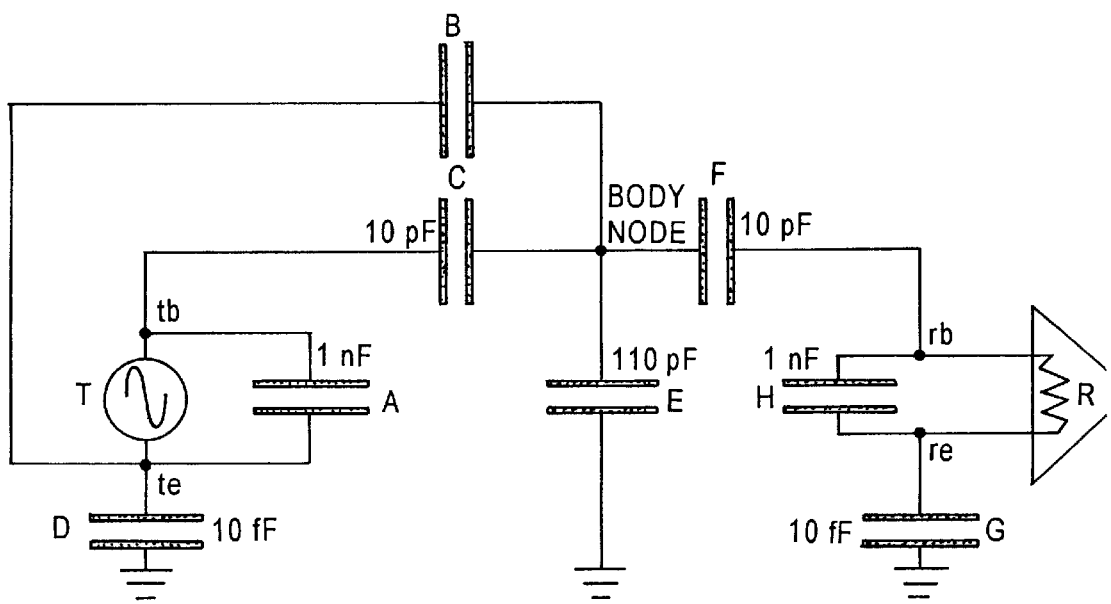
FIG. 4 shows the electrical circuitry of the PAN system.
Figure 5:
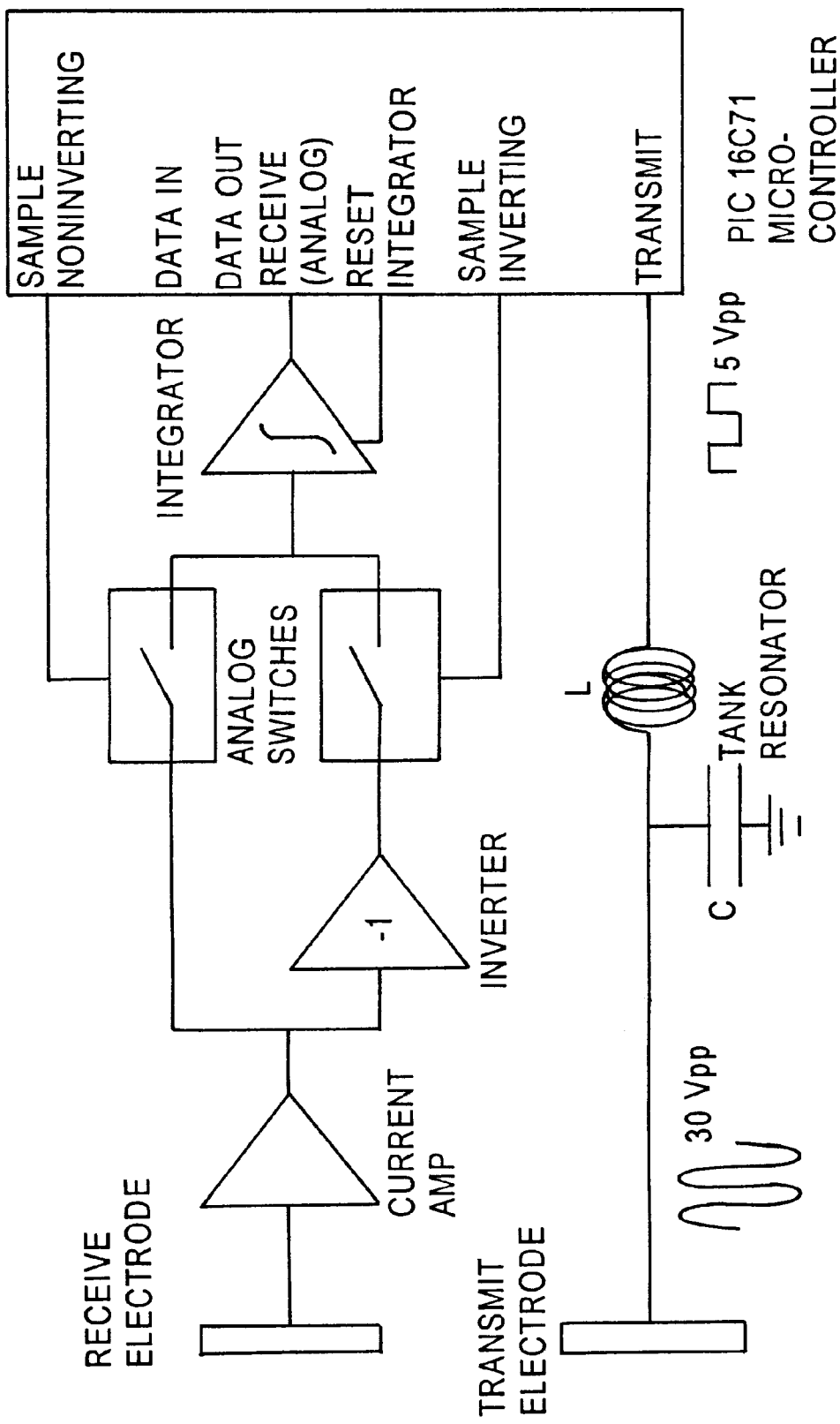
FIG. 5 shows further details of the circuitry.
Figure 6:
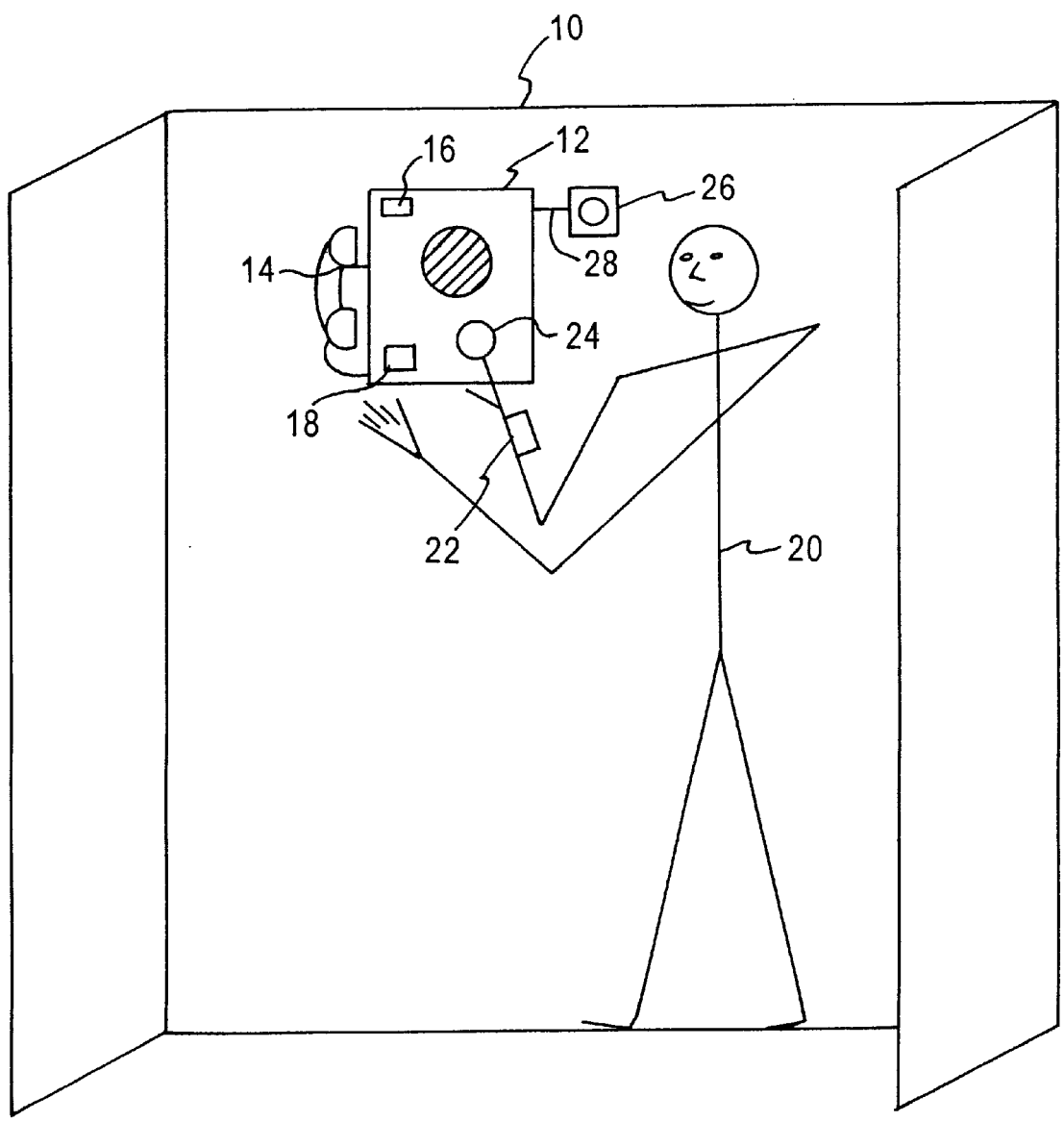
FIG. 6 shows a skeletal line depiction of a public toll or pay telephone booth with a customer or subscriber using the coin telephone.

Referring to FIG. 6 there is shown a skeletal line depiction of a toll or pay telephone booth 10 housing a coin telephone 12 having a handset 14 coin slot 16, and coin return 18. A subscriber 20 is shown equipped with a wrist watch version 22 of a PAN device of the type described in detail in the IBM Systems Journal publication referenced and discussed hereinabove. The subscriber is shown touching a sensor 24 which serves as the "antenna" of a PAN transceiver unit housed within the telephone 12. The transceiver unit is also of the same type as described in detail in the IBM Systems Journal publication. As previously stated, that publication is incorporated by reference herein in its entirety. The transceiver unit in the wrist watch PAN device produces a modulated signal that is detected and demodulated by the companion transceiver within the telephone housing, as described hereinabove. While the subscriber worn or carried PAN unit is here shown and discussed as a wrist watch unit, it is to be understood that other versions of such a transceiver may be utilized as previously discussed. Thus other possible versions may be provided in the form of a wallet or a self powered shoe mounted insert. Other varieties of PAN transceivers are discussed hereinabove. Also, while the transceiver in the telephone booth is shown as incorporated in the telephone terminal in FIG. 6, the preferred embodiment utilizes a separate transceiver mounted within the booth so as to be available to potential users. Such a separate mounted transceiver is shown diagrammatically at 26 connected to the telephone terminal by a suitable data link 28. FIG. 6 shows the subscriber lifting the telephone handset 14 to create an off-hook condition, as presently discussed.

The preferred implementations of the present invention are applied in a communication network comprising an intelligent implementation of a public switched telephone network. The preferred network includes a number of central office switches interconnected by trunk circuits and servicing a substantial number of telephone links. The intelligent network also includes a service control point storing a database of records used in controlling services provided through the central offices. A first signaling network carries signaling messages between the offices as well as signaling messages between the offices and the service control point. A multifunction intelligent peripheral is provided and also may exchange signaling information with the service control point, preferably over a second signaling network.

The preferred network includes a central office switching system capable of processing a call using profile information selected in response to a virtual equipment number. An office equipment or OE number is 'virtual' where it is assigned to an individual subscriber, instead of to specific network equipment such as a line termination or a specific station.

The switching system includes interface modules coupled to the communication links and a switch providing selective communication connections between the interface modules. An administrative module controls connections provided by the switch. The administrative module includes mass storage containing subscriber profiles, a processor for providing control instructions to the switch, and a signaling interface for signaling communication with at least one external network node. In response to a virtual office equipment number received via the signaling interface, e.g. from a separate peripheral platform as discussed above, the processor retrieves a subscriber profile corresponding to the virtual office equipment number from the mass storage. The processor uses the retrieved profile to process a selective connection through the switch between two of the interface modules.

In response to each of several types of service requests, the personalized service of the present invention initially identifies the individual subscriber or user, preferably using a speaker identification/verification procedure. While speaker identification is preferred it is to be understood that other biometric characteristics of the user, such as finger or hand prints may be used. The system then retrieves profile information corresponding to the identified subscriber or user. The communication network processes one or more calls to or from an identified communication link using the individual user's profile data. On an outgoing telephone call from the subscriber or user, for example, the service request may be an off-hook signal, and the network may provide 'dial-tone' type telephone services based on the retrieved profile information. In this example, the network may provide a dial tone signal or a customized prompt and then permit the caller to out-dial a call. Caller identification, calling features and/or additional identification of the responding party functions apply based on the profile information.

Figure 7:
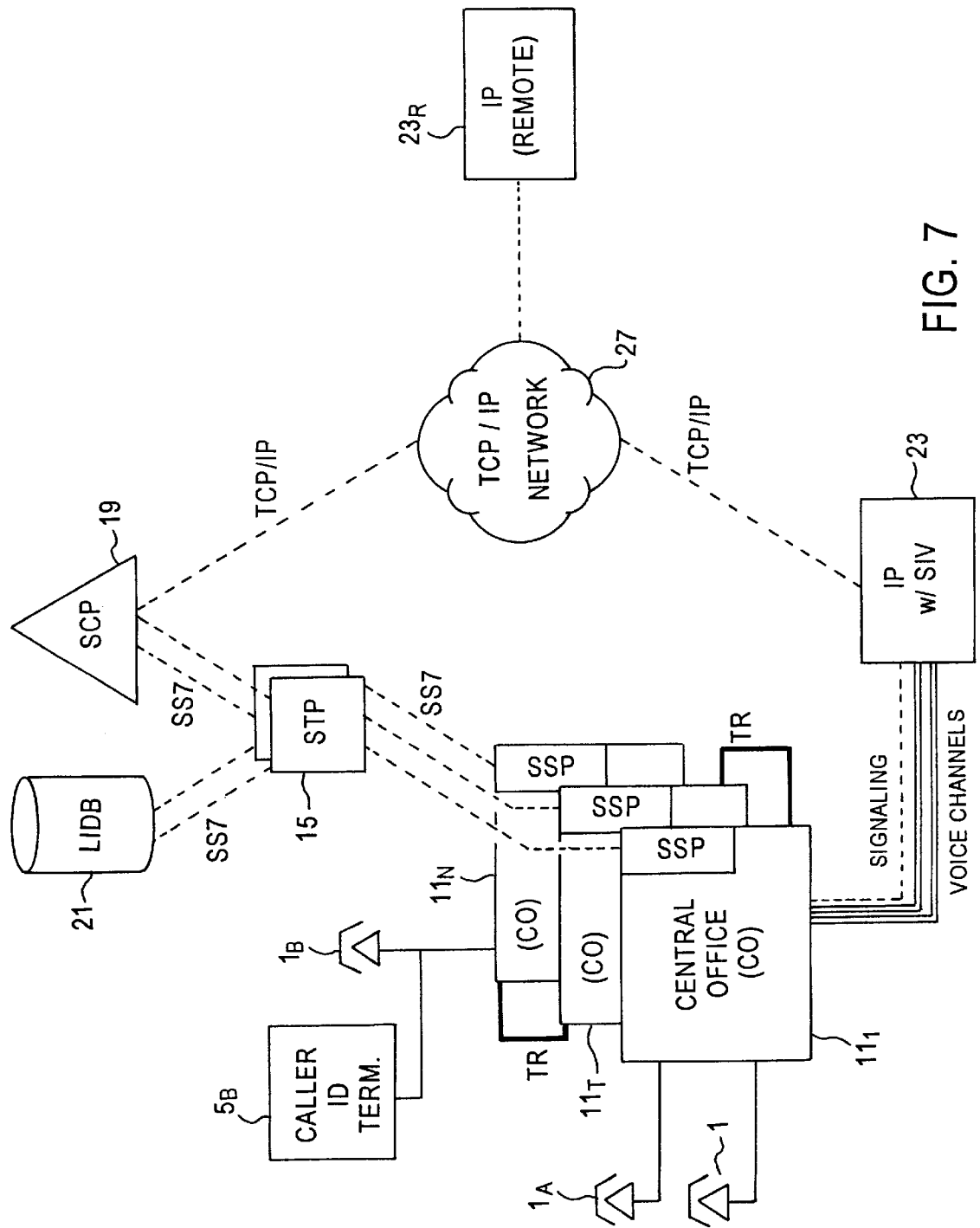
FIG. 7 is a simplified block diagram of an intelligent telephone network that may be used to offer advanced personalized telephone service.

FIG. 7 provides a simplified illustration of a preferred intelligent telephone network for implementing the personal dial tone service in accord with the present invention. As shown, the telephone network includes a switched traffic network and a common channel signaling network carrying the control signaling messages for the switched telephone traffic network. In this implementation, the system further includes a secondary signaling network.

The telephone or traffic network (operated by a combination of local carriers and interexchange carriers) includes a number of end office and tandem office type central office switching systems 11. FIG. 7 shows a number of subscriber stations, depicted as telephones 1, connected to a series of central office switches $11_1$ to $11_N$. In the preferred implementation, the connections to the central office switches 11 utilize telephone lines, and the switches are telephone type switches for providing landline communication. However, it should be recognized that other communication links and other types of switches could be used. Trunk circuits TR carry communication traffic between the central office switches 11.

Each end office type central office switch, such as 11 and $11_N$, provides switched telephone connections to and from local communication lines or other subscriber links coupled to end users stations or telephone sets 1. For example, the central office $11_1$ serves as an end office to provide switched telephone connections to and from local communication lines coupled to end users telephone station sets, such as telephone $1_A$, whereas the central office $11_N$ serves as an end office to provide switched telephone connections to and from local communication lines coupled to end users telephone station sets, such as telephone $1_B$.

The typical telephone network also includes one or more tandem switching offices such as office $11_T$, providing trunk connections between end offices. As such, the traffic network consists of local communication links and a series of switching offices interconnected by voice grade trunks, only two examples of which are shown at TR in FIG. 6. One set of trunks TR might interconnect the first end office $11_1$ to the tandem office $11_T$, whereas another set of trunks TR might interconnect the tandem office $11_T$ to another end office $11_N$. Other trunks might directly connect end offices. Although not shown, many offices serve as both end offices and tandem offices for providing different call connections.

FIG. 7 shows connections to the stations 1 via lines, and typically these links are telephone lines (e.g. POTS or ISDN). It will be apparent to those skilled in the art, however, that these links may be other types of communication links, such as wireless links. At least some of the stations have caller ID capability. If the line is an ISDN line, the station may incorporate a display for visually presenting the caller ID information and other signaling related messages. If the link is a typical analog telephone line, the customer premises equipment includes a caller ID terminal, one example of which is shown at $5_B$. The terminal $5_B$ displays at least telephone numbers and preferably displays alphanumeric information to enable displays of callers names.

Although shown as telephones in FIG. 7, the terminal devices or stations 1 can comprise any communication device compatible with the local communication link. Where the link is a standard voice grade telephone line, for example, the terminals could include facsimile devices, modems etc. The processing in accord with the invention, however, relies on identification of the subscriber, preferably by voice based recognition. For this purpose, the terminals preferably include two-way voice communication elements.

The lines and trunks through the central offices 11 carry the communication traffic of the telephone network. The preferred telephone network, however, also includes a common channel interoffice signaling (CCIS) network carrying a variety of signaling messages, principally relating to control of processing of calls through the traffic portion of the network. The CCIS network includes packet data links (shown as dotted lines) connected to appropriately equipped central office switching systems such as offices 11 and a plurality of packet switches, termed Signaling Transfer Points (STPs) 15. To provide redundancy and thus a high degree of reliability, the STPs 15 typically are implemented as mated pairs of STPs. The CCIS network of the telephone system operates in accord with an accepted signaling protocol standard, preferably Signaling System 7 (SS7).

In the preferred embodiment shown in FIG. 7, each central office 11 has at least minimal SS7 signaling capability, which is conventionally referred to as a signaling point (SP) in reference to the SS7 network. As such, the offices can exchanges messages relating to call set-up and tear-down, typically in ISDN-UP format. At least some, and preferably all, of the central office switches 11 are programmed to recognize identified events or points in call (PICs) as advanced intelligent network (AIN) type service triggers. In response to a PIC or trigger, a central office 11 initiates a query through the CCIS signaling network to a control node to either a Service Control Point (SCP) 19 or to a database system, such as a Line Identification Database (LIDB) 21. The SCP 19 provides instructions relating to AIN type services. The LIDB 21 provides subscriber account related information, for calling card billing services or for subscriber name display purposes in an enhanced caller ID application. Those central office switching systems having full AIN trigger and query capability for communication with the SCP and/or the LIDB are referred to as Service Switching Points (SSPs).

The central office switches 11 typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries. A specific example of an SSP capable switch is discussed in detail later, with regard to FIG. 8.

One key feature of the present invention is that the program controlled switch accepts instructions to load profiles and/or receives profiles over a signaling link. In most cases according to one feature of the invention, these profiles are identified by virtual office equipment numbers. The profiles include a range of information relating to subscribers services, such as service features, classes of service, individual billing options, and according to a preferred feature of the invention, information relating to restrictions applied to individual users, as well as the performance of functions related to that user.

The above described data signaling network between the SSP type central offices 11 and the SCP 19 is preferred, but other signaling networks could be used. For example, instead of the packet switched type links through one or more STP's, a number of central office switches, an SCP and any other signaling nodes could be linked for data communication by a token ring network. Also, the SSP capability may not always be available at the local office level, and several other implementations might be used to provide the requisite SSP capability. For example, none of the end office switches may have SSP functionality. Instead, each end office would connect through a trunk to a tandem office which has the SSP capability. The SSP tandem then communicates with the SCP via an SS7 type CCIS link, as in the implementation described above. The SSP capable tandem switches are digital switches, such as the 5ESS switch from AT&T; and the non-SSP type end offices might be 1A analog type switches.

The SCP 19 may be a general purpose computer storing a database of call processing information. In the preferred implementation, the SCP 19 actually is an Integrated Service Control Point (ISCP) developed by Bell Atlantic and Bell Communications Research. The ISCP is an integrated system. Among other system components, the ISCP includes a Service Management System (SMS), a Data and Reporting System (DRS) and the actual database also referred to as a Service Control Point (SCP). In this implementation, the SCP maintains a Multi-Services Application Platform (MSAP) database which contains call processing records (CPRs) for processing of calls to and from various subscribers. The ISCP also typically includes a terminal subsystem referred to as a Service Creation Environment or SCE for programming the MSAP database in the SCP for the services subscribed to by each individual customer.

The components of the ISCP are connected by an internal, high-speed data network, such as a token ring network. The internal data network also typically connects to a number of interfaces for communication with external data systems, e.g. for provisioning and maintenance. In the preferred embodiment, one of these interfaces provides communications to and from the SCP 19 via a packet switched data network, such as the TCP/IP network 27.

The SCP may be implemented in a variety of other ways. The SCP may be a general purpose computer running a database application and may be associated with one of the switches. Another alternative is to implement a database of CPRs or the like within an STP (see e.g. Farris et al. U.S. Pat. No. 5,586,177).

The LIDB database 21 is a general purpose computer system having a signaling link interface or connection to a pair of STPs 15. The computer runs a database program to maintain a database of information relating to customer accounts and identifications. For example, a subscriber's entry in the LIDB database might include the subscriber's telephone number, a personal identification number for credit card billing purposes, and the subscriber's name and address.

The preferred telephone network also includes one or more intelligent peripherals (IPs) 23 to provide enhanced announcement and digit collection capabilities and speech recognition. The IP 23 is essentially similar to that disclosed in commonly assigned U.S. Pat. No. 5,572,583 to Wheeler, Jr. et al. entitled "Advanced Intelligent Network with Intelligent Peripherals Interfaced to the Integrated Services Control Point," and the disclosure of the network and operation of the IP disclosed from that Patent is incorporated herein in its entirety by reference.

The IP 23 may connect to one or more central offices 11. The connections transport both communication traffic and signaling. The connection between a central office 11 and the IP 23 may use a combination of a T1 and a Simplified Message Desk Interface (SMDI) link, but preferably this connection utilizes a primary rate interface (PRI) type ISDN link. Each such connection provides digital transport for a number of two-way voice grade type telephone communications and a channel transporting signaling data messages in both directions between the switch and the IP.

As discussed more later, there are certain circumstances in which the SCP 19 communicates with the IP 23. These communications could utilize an 1129 protocol and go through an SSP type central office 11 and the SS7 network. However, in the preferred embodiment of FIG. 6, the IP 23 and the SCP 19 communicate with each other via a separate second signaling network 27. These communications through network 27 between the IP and the SCP may utilize an 1129+ protocol or a generic data interface (GDI) protocol as discussed in the above incorporated Patent to Wheeler, Jr. et al.

The IP 23 can provide a wide range of call processing functions, such as message playback and digit collection. In the preferred system, the IP also performs speaker identification/verification (SIV) on audio signals received from users. Specifically, the IP 23 used for the personalized service includes a voice authentication module to perform the necessary speaker identification/verification function. The IP 23 also includes storage for subscriber specific template or voice feature information, for use in identifying and authenticating subscribers based on speech.

In the simplest form, the IP 23 serving a subscriber's local area stores the templates and performs the speaker identification/verification. However, in a system serving a large geographic area and providing personal dial tone to a large, roaming subscriber base, the templates may be transferred between SCP/IP pairs, to allow an IP near a subscriber's current location to perform the speaker identification/verification on a particular call. For example, if a remote IP $23_R$ required a template for a subscriber from the region served by the IP 23, the remote IP $23_R$ would transmit a template request message through the network 27 to the IP 23. The IP 23 would transmit the requested template back through the network 27 to the remote IP $23_R$.

According to the present invention the PAN device carried by the subscriber has loaded and stored therein the subscriber specific template or voice feature (or other biometric) information, for use in identifying and authenticating subscribers based on speech. As is described in further detail hereinafter, the initial identification of the credit card number and PIN via the PAN device establishes a two way connection with the local link to the telephone with which the PAN device is associated. Following establishment of that connection the credit card number, PIN, customer or subscriber profile, voice mail interface, and voice templates are transferred to storage in the switching system environment in the local switched network. The profile and voice templates thus are immediately available in the local network for loading into the switch and the IP which handles voice authentication for that network. Voice authentication may then be effected and the caller may proceed with the call.

In a network such as shown in FIG. 7, routing typically is based on dialed digit information, profile information regarding the link or station used by the calling party, and profile information regarding a line or station in some way associated with the dialed digits. Each exchange is identified by one or more three digit codes. Each such code corresponds to the NXX digits of an NXX-XXXX (seven digit) telephone number or the three digits following the area code digits (NPA) in a ten-digit telephone number. The telephone company also assigns a telephone number to each subscriber line connected to each switch. The assigned telephone number includes the area code and exchange code for the serving central office and four unique digits.

Central office switches utilize office equipment (OE) numbers to identify specific equipment such as physical links or circuit connections. For example, a subscriber's line might terminate on a pair of terminals on the main distribution frame of a switch 11. The switch identifies the terminals, and therefore the particular line, by an OE number assigned to that terminal pair. For a variety of reasons, the operating company may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, an end office type switch will detect an off-hook condition on the line and provide dial tone. The switch identifies the line by its OE number. The office also retrieves profile information corresponding to the OE number and off-hook line. If needed, the profile identifies the currently assigned telephone number. The switch in the end office receives dialed digits and routes the call. The switch may route the call to another line serviced by that switch, or the switch may route the call over trunks and possibly through one or more tandem offices to an office that serves the called party's station or line. The switch terminating a call to a destination will also utilize profile information relating to the destination, for example to forward the call if appropriate, to apply distinctive ringing, etc.

AIN call processing involves a query and response procedure between an SSP capable switching office 11 and a database system, such as the SCP 19. The SSP capable switching offices initiate such processing upon detection of triggering events. At some point during processing of a telephone call, a central office switching system 11 will recognize an event in call processing as a 'Point in Call' (PIC) which triggers a query to the SCP 19. Ultimately, the SCP 19 will return an instruction to the switching system 11 to continue call processing. This type of AIN call processing can utilize a variety of different types of triggers to cause the SSPs 11 to initiate the query and response signaling procedures with the SCP 19. In the presently preferred embodiments discussed below, the personal dial tone service utilizes an off-hook immediate trigger, a dialed number trigger and a terminating attempt trigger (TAT), to facilitate different aspects of the service.

In accord with one preferred methodology for providing personalized service, before providing dial-tone service, the SSP central office 11 that is serving an outgoing call extends the call to the IP 23 providing the speaker identification/ verification (SIV) functionality. In the preferred embodiments, this operation involves AIN type call routing to the IP. The IP 23 prompts the caller and collects identifying information, preferably in the form of speech. The IP analyzes the caller's input to identify the caller as a particular subscriber. If successful, the IP signals the SSP to load profile data for that subscriber into the register assigned to the call in the call store. In most of the preferred service applications, the IP disconnects, and the SSP central office 11 processes the call in accord with the loaded profile information. For example, the central office 11 may now provide actual dial tone or provide a message prompting the caller to dial a destination number. The caller dials digits, and the central office processes the digits to provide the desired outgoing call service, in the normal manner. The IP may stay on the line, to monitor speech and thus caller identity, for some service applications.

The call processing by the central office switch 11 utilizes the loaded subscriber profile information. For example, the profile data may indicate specific procedures for billing the call to this subscriber on some account not specifically linked to the originating telephone station or line.

In accord with one preferred methodology for providing personalized service according to this invention, before providing dial-tone service, the SSP central office 11 that is serving an outgoing call extends the call to the IP 23 and downloads the specific templates from the PAN device for providing the speaker identification/verification (SIV) functionality. In the preferred embodiments, this operation involves AIN type call routing to the IP. The IP 23 prompts the caller and collects identifying information, preferably in the form of speech. This may constitute the caller speaking his full name. The IP analyzes the caller's input to identify the caller as a particular subscriber using the downloaded templates. If successful, the IP signals the SSP to load profile data for that subscriber into the register assigned to the call in the call store. The SSP loads that profile data from the PAN unit (with or without buffering). In most of the preferred service applications, the IP disconnects, and the SSP central office 11 processes the call in accord with the loaded profile information. For example, the central office 11 may now provide actual dial tone or provide a message prompting the caller to dial a destination number. The caller dials digits, and the central office processes the digits to provide the desired outgoing call service, in the normal manner. The call processing by the central office switch 11 utilizes the loaded subscriber profile information which may be identified by a virtual OE number. For example, the profile data may indicate specific procedures for billing the call to this subscriber on some account not specifically linked to the originating telephone station or line. This is particularly true with respect to public telephones such as pay phones. In addition to the complete portability of the subscriber data in the PAN, this system provides call processing by equipment in the local switching environment.

Selected subscriber profile information may also be used on incoming calls. When a serving central office SSP 11 detects a call to a line having the personalized service, processing hits a terminating attempt trigger (TAT). The SSP interacts with the SCP 19 and routes the call to the IP 23. The IP 23 prompts the caller to identify a desired called party. Menu announcement together with either digit collection or preferably speech recognition processing by the IP 23 facilitates identification of the desired called party from those associated with the line. Based on identification of the called subscriber, the IP 23 signals the SSP switch 11 to load profile data for that subscriber into the register assigned to the call in the call store. In this case, however, the switch 11 uses selectively loaded profile information for terminating the call. The IP disconnects, and the SSP central office 11 processes the call in accord with the loaded profile information.

For example, the central office 11 may provide a distinctive ringing signal corresponding to the identified subscriber. This service enables distinctive ringing for multiple subscribers on one line without assigning each subscriber a separate telephone number. The loaded profile information may specify call forwarding in event of a busy or no-answer condition. This enables routing of the call to the identified subscriber's mailbox, or another alternate destination selected by the subscriber, even though the call did not utilize a unique telephone number uniquely assigned to the called subscriber.

The present invention encompasses a procedure in which a subscriber calls in from a line not specifically designated for personal dial tone service, such as, for example, a public telephone. The network routes the call to the IP 23, and the IP identifies the subscriber and the line from which the subscriber called-in. The subscriber can interact with the IP 23 to have his or her personal dial tone service associated with that line, either for one call or for some selected period of time. The IP 23 instructs the appropriate central office switch(es) 11 to load profile data associated with the subscriber.

The IP 23 might instruct the end office switch to load the profile data only in the assigned call store register. The switch would use the profile data only for a single call, for example to bill a call from a pay-phone or a hotel room telephone to the subscriber's home account. This procedure is utilized for a PAN call as above discussed. Alternatively, the IP 23 might instruct the central office 11 serving the line to the calling station 1 to utilize a virtual office equipment number (OE) and associated profile data for calls to and from that line for some period of time. In this later example, the IP 23 would also instruct the central office 11 serving the line to the subscriber's home station 1 to modify the subscriber's profile to forward calls for the subscriber's telephone number. The modified profile data in the home office 11 would result in forwarding of the subscriber's incoming calls through the office 11 to the selected station 1, for the set period of time.

The present invention relies on the programmable functionality of the central office switches and the enhanced call processing functionalities offered by the IPs. To understand these various functionalities, it may be helpful to review the structure and operation of a program controlled central office and one implementation of an IP. Subsequent description will explain several of the above outlined call processing examples in greater detail.

Figure 8:
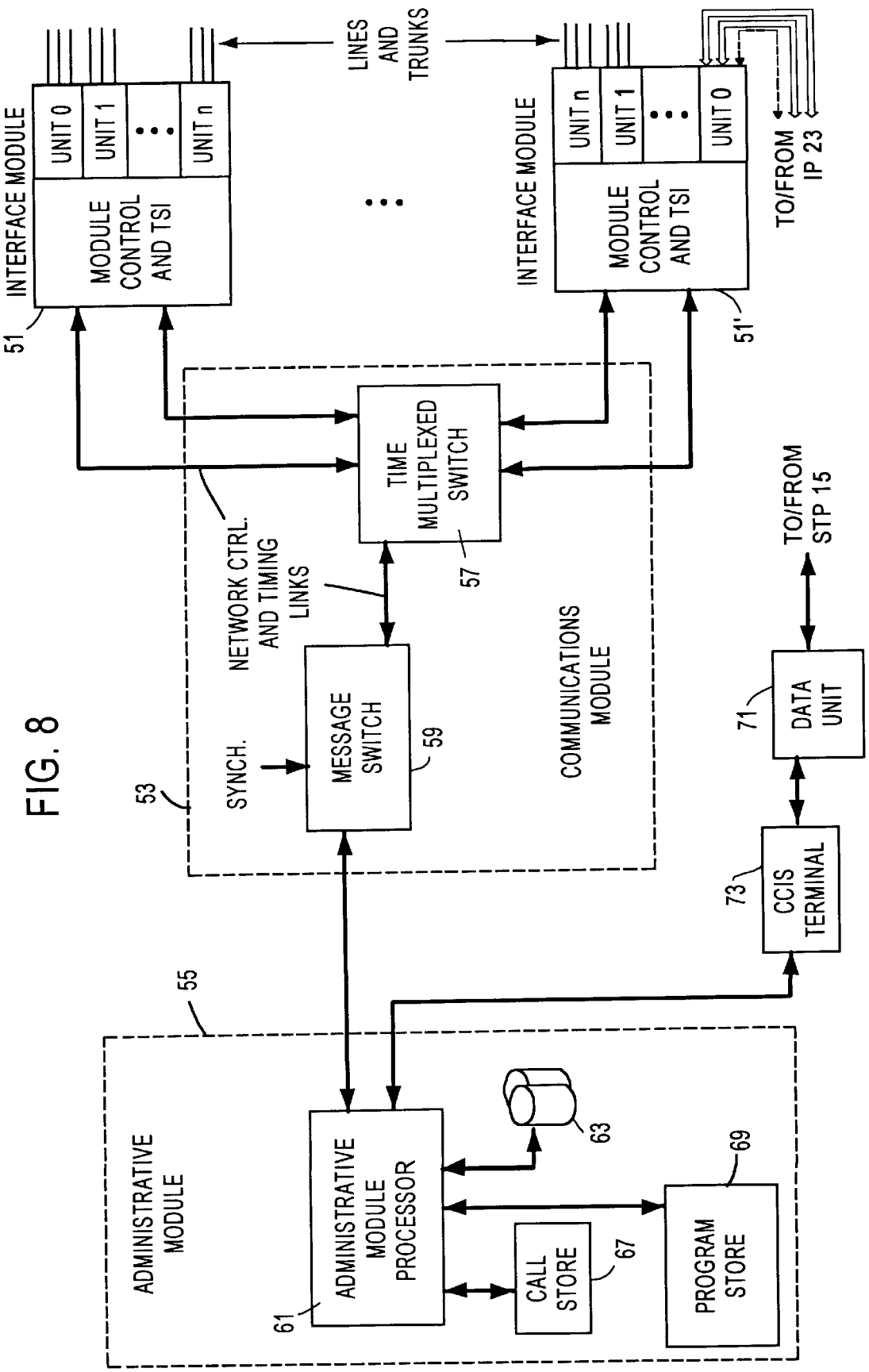
FIG. 8 is a simplified block diagram illustrating the significant functional components of an SSP type central office switching system used in the network of FIG. 7.

FIG. 8 is a simplified block diagram of an electronic program controlled switch which may be used as any one of the SSP type central offices 11 in the system of FIG. 6. As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Each such termination is identified by an OE number. Where the interfaced circuit is analog, for example a subscriber loop, the interface unit will provide analog to digital conversion and digital to analog conversion. Alternatively, the lines or trunks may use digital protocols such as T1 or ISDN.

Each interface module 51 also includes a digital service unit (not shown) which is used to generate call progress tones and receive and detect dialed digits in pulse code or dualtone multifrequency form.

In the illustrated embodiment, the unit 0 of the interface module 51' provides an interface for the signaling and communication links to the IP 23. In this implementation, the links preferably consist of one or more ISDN PRI circuits each of which carries 23 bearer (B) channels for communication traffic and one data (D) channel for signaling data.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers signaling data messages between the interface modules. The switch 57 together with the TSIs of the interface modules form the overall switch fabric for selectively connecting the interface units in call connections.

The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 provides high level control of all call processing operations of the switch 11. The administrative module 55 includes an administrative module processor 61, which is a computer equipped with disc storage 63, for overall control of CO operations. The administrative module processor 61 communicates with the interface modules 51 through the communication module 55. The administrative module 55 may include one or more input/output processors (not shown) providing interfaces to terminal devices for technicians and data links to operations systems for traffic, billing, maintenance data, etc.

A CCIS terminal 73 and an associated data unit 71 provide an SS7 signaling link between the administrative module processor 61 and one of the STPs 15 (see FIG. 6). Although only one such link is shown, preferably there are a plurality of such links providing redundant connections to both STPs of a mated pair and providing sufficient capacity to carry all necessary signaling to and from the particular office 11. The SS7 signaling through the terminal 73, the data unit 71 and the STPs provides two-way signaling data transport for call set-up related messages to and from other offices. These call set-up related messages typically utilize the ISDN-UP (ISDN-users part) protocol portion of SS7. The SS7 signaling through the terminal 73, the data unit 71 and the STPs also provides two-way signaling data transport for communications between the office 11 and database systems or the like, such as the SCP 19. The communications between the office 11 and the database systems or the like utilize the TCAP (transactions capabilities applications part) protocol portion of SS7.

As illustrated in FIG. 8, the administrative module 55 also includes a call store 67 and a program store 69. Although shown as separate elements for convenience, these are typically implemented as memory elements within the computer serving as the administrative module processor 61. The program store 69 stores program instructions which direct operations of the computer serving as the administrative module processor 61.

For each call in progress, a register assigned within the call store 67 stores translation and user profile information retrieved from disc storage 63 together with routing information and any temporary information needed for processing the call. For example, for a residential customer initiating a call, the call store 67 would receive and store line identification and outgoing call billing information corresponding to an off-hook line initiating a call. For the personal dial-tone service, the assigned register in the call store 67 will receive and store different profile data depending on the particular subscriber associated with any given call. A register in the call store is assigned and receives profile data from the disc memory both for originating subscribers on outgoing calls and for terminating subscribers on incoming calls.

Figure 9:
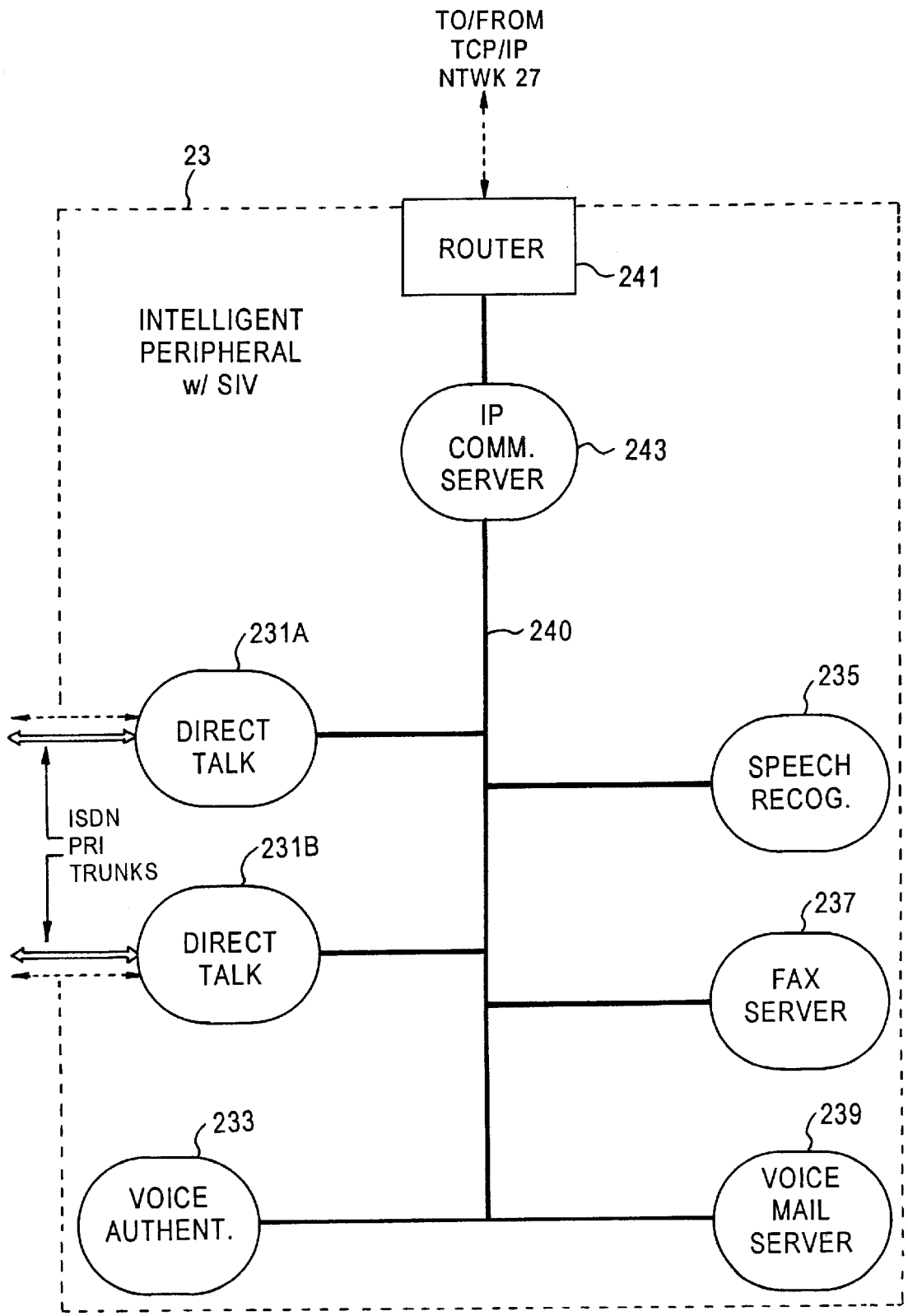
FIG. 9 is a simplified block diagram illustrating the significant functional components of an Intelligent Peripheral (IP) used in the network of FIG. 7.

A variety of adjunct processor systems known in the telephone industry can be used as the IP 23. The critical requirements are that the IP system process multiple calls and perform the subscriber identification functions, preferably by speaker identification and authentication. FIG. 9 is a functional diagram illustration of an IP 23 for performing the subscriber identification functions, possibly by dialed digit input and preferably by analysis and recognition of speech.

The preferred IP architecture utilizes separate modules for different types of services or functions, for example, one or two Direct Talk type voice server modules 231A, 231B for interfacing ISDN PRI trunks to the SSP central office(s) 11. Separate modules 233, 235 perform voice authentication and speech recognition. The IP 23 includes a variety of additional modules for specific types of services, such as a server module 237 for fax mail, and another server 239 for voice mail services. The various modules communicate with one another via an internal data communication system or bus 240, which may be an Ethernet type local area network.

Each Direct Talk module 231A or 231B comprises a general purpose computer, such as an IBM RS-6000, having digital voice processing cards for sending and receiving speech and other audio frequency signals, such as IBM D-talk 600 cards. Each voice processing card connects to a voice server card which provides the actual interface to T1 or primary rate interface ISDN trunks to the switching office. In the PRI implementation, the Direct Talk computer also includes a signaling card, providing two-way signaling communication over the D-channel of the PRI link. Each Direct Talk computer also includes an interface card for providing two-way communications over the internal data communications system 240.

The voice processing cards in the Direct Talk modules 231A, 231B provide voice message transmission and dialed digit collection capabilities. The modules 231A, 231B also perform the necessary line interface functions for communications to and from those servers which do not incorporate actual line interfaces. For example, for facsimile mail, a Direct Talk module 231 connected to a call would demodulate incoming data and convert the data to a digital format compatible with the internal data communication network 240. The data would then be transferred over network 240 to the fax server 237. For outgoing facsimile transmission, the server 237 would transfer the data to one of the Direct Talk modules over the network 240. The Direct Talk module 231 would reformat and/or modulate the data as appropriate for transmission over the ISDN link to the switch 11.

The Direct Talk modules provide a similar interface function for the other servers, such as the voice mail server 239, the speech recognition module 235 and the voice authentication module 233. For incoming speech signals, the Direct Talk module connected to a call receives digital speech signals in the standard pulse code modulation format carried on a B-channel of an ISDN link. The Direct Talk module reformats the speech data and transmits that data over the internal network 240 to the server or module performing the appropriate function, for example to the authentication module 233 for analysis and comparison of features to stored templates or feature data for known subscribers.

In the outgoing direction, the currently connected Direct Talk module may play an announcement from memory, e.g. to prompt a caller to say their name. Alternatively, the Direct Talk module may receive digitized speech over the network 240 from one of the other modules, such as a stored message retrieved from voice mail server 239. The Direct Talk module reformats the speech signal as needed for transmission over the ISDN B-channel to the caller.

The illustrated IP also includes a communication server 243. The communication server 243 connects between the data communication system 240 and a router 241, which provides communications access to the TCP/IP network 27 that serves as the second signaling communication system. The communication server 243 controls communications between the modules within the IP 23 and the second signaling communication system. The server 243 and the router 241 facilitate communication between the elements of the IP 23 and the SCP 19. The IP may also use this communication system to communicate with other IP's, for example to send subscriber voice template information to the remote IP $23_R$ (FIG. 6) or to receive such information from that IP or some other network node.

The personalized service relies on the voice authentication module 233 to perform the necessary speaker identification/verification function. For the identification and authentication of subscribers or users, the voice authentication module 233 within the IP 23 stores a template or other feature or voice pattern information for each person who has the personalized service in the area that the IP services. For example, if the subscriber utilizes the personal dial tone service from a particular line, such as a shared line in a dormitory or the like, the IP stores the subscriber's voice pattern information in a file associated with the office equipment (OE) number of the particular line. If the IP 23 serving a call does not store the template or feature data for a particular subscriber, the IP 23 may obtain subscriber identification by dialed digit input and then obtain a copy of the template or feature data from a remote IP $23_R$ via communication through the TCP/IP network 27, in order to authenticate the subscriber's identity.

Using current technology, a new subscriber or user would get on line with the IP serving that subscriber and 'train' that IP by speaking certain phrases. From the received audio signals representing those phrases, the IP would store templates or other pattern information for use in identifying and/or verifying that a caller is the particular subscriber.

During actual call processing, the voice authentication module 233 receives speech information from the caller. The voice authentication module 233 compares the received information to its stored template or feature data to identify a calling party as a particular subscriber.

In the case of speech recognition applied to incoming calls, the IP is trained in a different manner. Current speech recognition technology permits recognition with a reasonable degree of certitude based on training from a limited sample of recorded speech of a subject. In situations where the target of the speech recognition is not such as may participate in the cooperative manner of subscribers, recorded samples of prior telephone speech may be used with available recognition facilities of a more sophisticated nature.

In such situations the present invention also relies on the speech recognition capability of the module 235, particularly in processing of incoming calls in certain situations. The speech recognition module 235 enables the IP to analyze incoming audio information to recognize vocabulary words. The IP 23 interprets the spoken words and phrases to determine subsequent action. For example, the IP might recognize the caller speaking the name of a called subscriber and use the subscriber identification to instruct the terminating central office to control the call in accord with that subscriber's profile.

In a first example of the operation of a preferred embodiment of the invention, consider an outgoing call from the station $1_A$ to the station $1_B$. Assume that the station $1_A$ is a public station as shown in FIG. 7 and is equipped with a PAN transceiver connected to the local link serving the telephone. The person or subscriber 20 wearing or bearing a near field PAN transceiver 22, touches the sensor 24 to establish a coupling and communication between the mobile PAN unit 22 and the booth mounted PAN unit. A handshake between the mobile and stationary units occurs and the mobile unit transmits to the stationary unit a request to initiate a personal service PAN call. The mobile unit transmits initial subscriber identification, such as the home telephone number, virtual OE, credit card number, and PIN of the subscriber who owns or is the authorized possessor of the mobile PAN unit. The stationary PAN unit transmits this transferred information to the SSP to which the telephone station $1_A$ is connected.

At this time the person initiating the PAN call may or may not have gone off-hook. While the telephone station in FIG. 6 is shown with a handset 14 the invention comprehends use of telephone stations which may not utilize a handset, such as speaker/microphone type stations. In this example the PAN signal is utilized to initiate the call processing rather than the off hook signal. In this type of call flow, the PAN signal serves as a type of service request, i.e. a request to make an outgoing call. The serving central office $11_1$ detects this and commences its call processing. Specifically, the central office assigns a register in the call store 67 to this call and loads profile information associated with the service requesting line from the disc storage 63 into the assigned register. In this case, the central office $11_1$ is an SSP capable office, and the loaded profile data indicates an originating trigger set against the particular line. The originating trigger may be an off-hook immediate trigger or a trigger set against a data signal transmitted by the mobile PAN unit in its initial download of data to the stationary PAN unit. The serving SSP type office $11_1$ therefore detects this originating PIC as an AIN trigger.

In response to the initiating PAN signal and the originating trigger set in the profile of the line to station $1_A$, the SSP type central office switch $11_1$ launches a query to the SCP 19. Specifically, the SSP $11_1$ creates a TCAP query message containing relevant information, such as the office equipment (OE) number assigned to the off-hook line, and identification of the mobile PAN unit and its request. This message is sent over an SS7 link to one of the STPs 15. The query includes a destination point code and/or a global title translation addressing the message to the SCP 19, and the STP 15 relays the query message over the appropriate link to the SCP 19. The query from the SSP central office $11_1$ identifies the caller's line by its associated office equipment (OE) number and possibly by a single telephone number associated with the line. The query may also identify the virtual OE number of the subscriber which was transferred from the subscriber borne PAN unit.

In response to the query, the SCP 19 accesses its database, typically, the MSAP database set up in the ISCP, to determine how to process the particular call. The SCP 19 identifies an access key in the query and uses the key to retrieve the appropriate record from the database. In this case, the query indicates a PAN trigger as the trigger event, and therefore the SCP 19 uses the PAN trigger and the calling line office equipment (OE) number as the access key. The SCP 19 retrieves from its database a call processing record and data relating to the handling of PAN requests. The particular retrieved processing record (CPR) corresponds to the office equipment (OE) number associated with the requesting line.

For the present example of the personal dial tone service, the PAN data will provide information necessary for routing the call to some node of the network that will perform speaker identification/verification (SIV). In the preferred embodiment, the SIV is a function performed by an Intelligent Peripheral (IP), therefore the CPR provides information for routing the call to the nearest available IP having the SIV capability. Typically this will be found within the local environment of the switching system.

Based on the profile record, the SCP 19 formulates a response message instructing the SSP central office $11_1$ serving the customer to route the call. In this case, the message includes information, e.g. a office equipment (OE) number or telephone number, used for routing a call to the identified IP 23. The SCP 19 formulates a TCAP message in SS7 format, with the destination point code identifying the SSP office $11_1$. The SCP 19 transmits the TCAP response message back over the SS7 link to the STP 15, and the STP 15 in turn routes the TCAP message to the SSP central office $11_1$. The TCAP message also includes instructions to the SSP to load the customer profile of the subscriber which corresponds to the subscriber's virtual OE number. The subscriber profile corresponding to the virtual OE number was initially downloaded from the subscriber borne PAN unit into the storage associated with the stationary PAN unit.

The SSP type switch in the central office $11_1$ responds to the routing information by downloading the virtual OE profile from the stationary PAN store to the mass storage of the switching system, and connects the call to one of the lines or channels to the IP 23. A two-way voice grade call connection now extends between the calling station $1_A$ and the IP 23. In the present example, the switch actually connects the calling line to the line to the IP before providing dial tone to the caller.

As noted above, the communication link to the IP 23 provides both line connections and signaling, preferably over a primary rate interface (PRI) type ISDN link. When the central office $11_1$ extends the call from the calling party's line to a line circuit (over a B channel) to the IP 23, the switch in that office also provides call related data over the signaling link (D channel for ISDN). The call related data, for example, includes the office equipment (OE) number normally associated with the off-hook line and the virtual OE number of the calling subscriber. This identifies the profile which was transferred from the stationary PAN unit to the switching system storage.

In response to the incoming call, the IP 23 will seize the line, and it will launch its own query to the SCP 19. In the preferred network illustrated in FIG. 6, the IP 23 and the SCP 19 communicate with each other via a separate second signaling network 27, for example utilizing either an 1129+ protocol or a generic data interface (GDI) protocol as discussed in U.S. Pat. No. 5,572,583 to Wheeler, Jr. et al. The query from the IP 23 again identifies the caller's line by at least its associated office equipment (OE) number. The query also identifies the virtual OE number of the subscriber which was transferred from the subscriber borne PAN unit.

In response to the query from the IP 23, the SCP 19 again accesses the appropriate CPR and relevant PAN DATA, and provides a responsive instruction back through the network 27 to the IP 23. The SCP also instructs the switching system to load the virtual OE profile from the switch mass storage into a call register, and instructs the IP to retrieve and load the speech templates corresponding to the virtual OE number.

Although the IP 23 could passively monitor any speech that the user might utter, the preferred implementation utilizes a 'Challenge Phase' to prompt the user to input specific identifying information. In this case, the instruction causes the IP 23 to provide a prompt message over the connection to the caller. Here, the signal to the caller may be a standard dial tone or any other appropriate audio signal. Preferably, the instruction from the SCP 19 causes the IP 23 to provide an audio announcement prompting the caller to speak personal information. In one preferred example, the IP plays an audio prompt message asking the caller, 'Please say your full name'. The process may ask for any appropriate identifying information.

The signal received by the IP 23 goes over the lines and through the central office switch(es) for presentation via the telephone $1_A$ to the calling party. In response, the caller will speak identifying information into the microphone or handset, and the network will transport the audio signal to the IP 23.

As noted above, an IP 23 can provide a wide range of call processing functions, such as message playback and digit collection. In the preferred system, the IP also performs speaker identification/verification (SIV) on the audio signal received from the off-hook telephone. When the IP 23 receives speech input information during actual call processing, for this service example, the IP analyzes the speech to extract certain characteristic information.

The IP 23 typically stores a template or other voice pattern information for each person who has the personalized service in the area that the IP normally services. If the IP 23 does not store the particular template or feature information it needs to process a call, the IP 23 can communicate with a remote IP $23_R$ to obtain that information. In the present example of a PAN call, the SCP has instructed the IP that the virtual OE number identifies a template which is stored in the stationary PAN storage or in storage in the switch. The IP 23 communicates with the SSP to which it is connected and retrieve the template either from storage in the switch to which it has been downloaded by the stationary PAN or from the storage in the stationary PAN itself.

When the IP 23 receives input speech from the caller, and extracts the characteristic information during actual call processing, the IP compares the extracted speech information to stored pattern information in the template which it has retrieved, to identity and authenticate the particular caller. In the present example, the voice authentication module 233 in the IP 23 compares the extracted speech information to the template which was brought to it by the mobile PAN.

The IP 23 determines if the information extracted from the speech input matches the template data. If there is a match, the IP now knows the identity of the calling person. It is to be noted that this identification identifies both the mobile PAN and the person using the PAN unit. Based on the identification of the calling person and the virtual OE number supplied from the PAN, the IP 23 formulates a D-channel signaling message containing the virtual office equipment (OE) number together with an instruction to load that OE number into the register assigned to the call in place of the OE number of the off-hook line. The IP 23 supplies the message to the SSP central office switch $11_1$ over the D-channel of the ISDN PRI link. In response, the administrative module processor 61 rewrites the OE number in the register assigned to the call using the OE number received from the IP 23.

Upon rewriting the OE number in the register, the administrative module processor 61 of central office switch $11_1$ also reloads the profile information in the register. Specifically, the administrative module processor 61 retrieves profile information associated with the virtual office equipment (OE) number from the disc storage 63 into the register or from the stationary PAN if the profile was not previously downloaded. As such, the profile information in the assigned register in the call store 67 now corresponds to the identified caller, rather than to the off-hook line to the public station.

The profile information provides a wide range of data relating to the caller's services. The profile data provides necessary billing information, enabling billing from the call to this particular caller. The profile also defines various service features available to this subscriber on outgoing calls, such as three-way calling. The profile may define a class of calling service available to the particular calling subscriber.

In the presently preferred implementation, when the central office switch $11_1$ reloads the profile, the central office disconnects the link to the IL 23 and connects tone receivers to the caller's line. Optionally, the central office $11_1$ may provide a 'dial tone' or other message over the line. The caller now dials digits in the normal manner, and the switch in the central office $11_1$ loads the dialed digits into the assigned register within the call store 67. The central office $11_1$ utilizes the dialed digits and the subscriber's profile data to process the call. For example, if the dialed digits represent a call within the subscriber's permitted class of service, the switch completes the call to the destination station $1_B$ using the dialed digits in the normal manner. If the profile data requires a particular billing treatment, e.g. to bill a long distance call to the caller, the switch makes the appropriate record and forwards the record to the exchange carrier company's accounting office equipment.

In accord with another aspect of the invention, the network provides caller ID data naming the identified caller to a display at the destination station. Two processing methodologies are envisioned for providing this calling subscriber ID feature. One method involves accessing name information in a central database, such as LIDB, and the other method relies on name data from the PAN subscriber's profile. This latter method is preferred in that it is not dependent on the data involved in the local LIDB, which might not contain the desired information regarding this roaming subscriber.

The call completion operations using data from the profile to provide caller ID display are now described. The network performs the steps of this process after identification of the subscriber, preferably based on speaker identification/verification (SIV). As discussed earlier, the IP 23 supplies the signaling message containing the virtual office equipment (OE) number and the instruction to load that OE number into the assigned register to the SSP central office switch $11_1$ over the D-channel of the ISDN PRI link. In response, the administrative module processor 61 rewrites the OE number in the register and reloads the PAN provided profile information in the register.

The central office $11_1$ provides dial tone or the like over the line, the caller dials digits corresponding to the desired destination, and the switch in the central office $11_1$ begins its processing to route the call through the network. Initially, the central office $11_1$ uses the dialed number to initiate a CCIS communication with the exchange serving the intended destination, in this example the terminating central office $11_N$.

Specifically, the caller's serving central office $11_1$ generates an Initial Address Message (IAM) for transmission to the terminating central office 111. The IAM message includes the SS7 destination point code (DPC) of the terminating central office $11_N$ and the SS7 origination point code (OPC) of the customer's serving-end central office $11_1$, for addressing purposes. The payload portion of the IAM message includes the called and calling numbers. In accord with the invention, the originating end office $11_1$ reads name data provided by the PAN unit along with the identified caller's profile, currently loaded in the assigned register, and places that data in additional fields of the IAM message or in an accompanying information message addressed in the same manner as the IAM message. The originating central office transmits the IAM message and possibly an accompanying information message through the CCIS network to the distant terminating office $11_N$.

When the terminating office $11_N$ receives the IAM message, the administrative module processor for that office retrieves the customer profile for the number in the destination number field of that message (e.g. the number for the telephone $1_B$) from its mass storage system and loads that profile into one of its call store registers. If the called party has an enhanced caller ID service, with name display, the terminating central office $11_N$ would normally recognize the attempt to complete to that party's number message as a terminating attempt trigger (TAT) type point in call (PIC) to trigger access to the LIDB database for name information. However, in this embodiment of the invention, the terminating end office detects the receipt of the subscriber's name data with the IAM message, therefore the administrative module processor in that office overrides the trigger.

The terminating central office switching system $11_N$ transmits an Address Complete Message (ACM) back to the central office $11_1$ and if the called line is available applies ringing signal to the called party's line. The ACM message is sent back by simply reversing the point codes from the IAM message. Now the destination point code (DPC) is the point code of the central office 11, and the origination point code (OPC) is the point code of the central office 13. In response to the ACM message, if the called line is available, the originating central office 11 applies a ringback tone signal to the line to the calling station $1_A$.

As part of its operations to ring the called telephone station, the terminating central office $11_N$ transmits a caller ID signal over the line. If the called party has ISDN service or the like, the switch sends a signaling message along with the ringing signal. If the called party has analog telephone service, the switch $11_N$ transmits a caller ID message as frequency shift keyed (FSK) data inserted in the silent interval between the first ringing signal and the second ringing signal applied to the called party's line.

In accord with the invention, the caller ID message applied to the called party's line includes the telephone number associated with the calling station $1_A$ and at least some additional data specific to the identified subscriber. If the called party has enhanced caller ID for displaying name data, the ISDN telephone or the caller ID terminal $5_B$ receives the number and the name data received with the IAM message. The caller ID terminal $5_B$ or a display device in the ISDN telephone displays the received number and name information, identifying the actual calling party, for review before the called party chooses to answer the call.

If the called party subscribes only to normal caller ID, the end office switch $11_N$ can transmit only a limited amount of information. For this purpose, the switch will select and transmit one or two characters from the subscriber identification data along with the telephone number.

If someone answers the telephone station $1_B$, the terminating central office switching system $11_N$ detects an off-hook condition and sends an Answer Message (ANM) back to the originating central office $11_1$ through one or more of the STPs 15. The ANM message indicates that the called telephone $1_B$ was picked up. Also, at that time the actual telephone traffic trunk circuit is connected together between the central offices $11_1$ and $11_N$. The central offices 11 connect the lines to the stations to the respective ends of the trunk circuit, to complete the voice path. At this point, actual voice communication is established between the calling station $1_A$ and the called station $1_B$. Communication continues until one or both parties hang up, at which time, all of the switched connections are torn down.

The first detailed example discussed above related to personal dial tone service provided on a PAN initiated basis on line to a public telephone. An alternate form of the personal dial tone PAN service can be activated on a dial-up basis. Consider now an example of a dial-up activation for a single call.

For this example, assume that a caller's normal or 'home' telephone is telephone $1_B$. The end office switch $11_N$ stores the subscriber profile data for the line associated with that telephone station. Now assume that the subscriber is using a public station $1_A$ connected through a telephone line to central office $11_1$.

The subscriber lifts the handset creating an off-hook state in the telephone $1_A$ and a signal to office 11. The serving central office $11_1$ detects the off-hook and commences its call processing. Specifically, the central office assigns a register in the call store 67 to this call and loads profile information associated with the off-hook line from the disc storage 63 into the register. In this case, the profile data associated with the line does not provide an off-hook trigger. The central office $11_1$ therefore provides dial tone in the normal manner.

If making a normal call, the caller would dial a destination number, and the network would complete the call as dialed.

To activate the personal dial tone PAN service, however, the caller dials an access number assigned to that service, such as 1-800-DIALPAN, from the station $1_A$.

The dialing of an outgoing call, in this case to the access number, is another type of service request. The central office switch $11_1$ recognizes the dialed access number as a trigger event or 'PIC'. The SSP type central office $11_1$ creates a TCAP query message containing relevant information, such as the office equipment (OE) number and/or telephone number assigned to the off-hook line, the dialed number and the type of triggering event. The office $11_1$ transmits that query to the SCP 19 (step S35). Specifically, the SSP central office $11_1$ transmits the query over an SS7 link to one of the STPs 15. The query includes a point code and/or a global title translation addressing the message to the SCP 19, and the STP 15 relays the query message over the appropriate link to the SCP 19.

In response to a query, the SCP 19 accesses its database to determine how to process the particular call. In this case, the query indicates the dialed number type trigger and provides the digits of the specific number dialed. The SCP 19 uses the dialed number as the access key. The SCP 19 retrieves a call processing record (CPR) corresponding to that number associated with the personal dial tone PAN access function. For the current exemplary access, the CPR will provide information necessary for routing the call to the IP 23 that will perform the necessary speaker identification/verification (SIV).

Based on the CPR, the SCP 19 formulates a response message instructing the SSP central office $11_1$ serving the customer to route the call. In this case, the message includes information, e.g. a office equipment (OE) number or telephone number, used for routing a call to the identified IP 23. The SCP 19 formulates a TCAP response in SS7 format and transmits the TCAP response message back to the SSP central office $11_1$.

The SSP type switch in the central office $11_1$ uses the routing information to connect the call to a line or channel to the IP 23. A voice grade call connection now extends between the calling station $1_A$ and the IP 23.

The central office $11_1$ provides a signaling message to the IP 23 with the call. In this case, the signaling message includes the dialed digits indicating a call to the personal dial tone PAN access number. The signaling message also includes either the office equipment number or the telephone number of the line to the calling station $1_A$.

As in the earlier example, the IP 23 will seize the line for the incoming call and launch a query to the SCP 19 through the TCP/IP network 27. The SCP 19 accesses an appropriate CPR, and based on that CPR, the SCP 19 transmits back a message instructing the IP 23 to execute a program or script for the dial-up access to the personal dial-tone PAN service.

The IP initially plays a greeting and a prompt message. The prompt message instructs the caller to touch the PAN sensor. This downloads the stored mobile PAN data to the stationary PAN unit and to the switch as previously described. The IP retrieves the speech template from the stationary PAN unit and issues the challenge prompt to the caller. When the caller responds, as by speaking his or her name, the voice authentication module 233 analyzes the spoken identification information to extract characteristic information. This is compared to the retrieved template to determine if there is an adequate match.

If there is a match, the IP now knows the identity of the caller. Based on the now established identity of the caller, the IP 23 formulates a D-channel signaling message instructing the switch $11_1$ to load the PAN identified and provided profile into the register assigned to the call in place of the profile information corresponding to the off-hook line. The IP 23 supplies the message to the SSP central office switch $11_1$ over the D-channel of the ISDN PRI link. In response, the administrative module processor 61 rewrites the profile data in the register assigned to the call using the data from the PAN. As such, the profile information in the assigned register now corresponds to the identified subscriber caller.

When the central office switch $11_1$ reloads the profile, the central office disconnects the link to the IP 23 and connects tone receivers to the caller's line. The central office $11_1$ may also provide a standard dial tone or other message over the line. The caller can now dial digits in the normal manner, and the switch in the central office $11_1$ will load the dialed digits into the assigned register within the call store 67. The central office $11_1$ utilizes the dialed digits and the subscriber's profile data to process the call. For example, the switch in central office $11_1$ may provide the appropriate record to bill the outgoing call to the caller's account. In accord with the invention, the network also provides the caller specific information for caller ID purposes, in the manner discussed in detail above.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A communication system comprising:
   a switching system connected to a link serving a terminal;
   a first Personal Area Network (PAN) transceiving device connected to said serving terminal;
   a portable PAN transceiving device containing data stored therein identifying an associated telephone network subscriber including speech recognition templates unique to said subscriber and identifying network services to which said subscriber is authorized, said first PAN transceiving device and said portable PAN transceiving device operative to generate and receive near-field electric field signals when coupled to the body of a person; and
   a control processor linked to said switching system for receiving therefrom the speech recognition templates and network services data for said subscriber upon coupling of said first PAN transceiving device and said portable PAN transceiving device through the person's body;
   whereby said control processor is capable of processing calls originated from said serving station by said subscriber in dependence upon said network services data and said speech templates.

2. A system as recited in claim 1, wherein said control processor comprises a Signal Control Processor (SCP) in a Public Switched Telephone Network (PSTN)Advanced Intelligent Network (AIN).

3. A system as recited in claim 2, wherein said control processor comprises an additional Intelligent Peripheral (IP) remotely located from said SCP.

4. A system as recited in claim 1, wherein said network services data is linked to a virtual Office Equipment (OE) number associated with a register in said switching system.

5. A system as recited in claim 4, wherein said control processor comprises a speech recognition module for comparing an utterance spoken by a person at said serving terminal with said speech templates to verify the identity of the person as said subscriber.

6. A method for processing a telephone call originating from a telephone station having connected thereto a first Personal Area Network (PAN) transceiving device, said method comprising the steps of:

coupling said first PAN transceiving device, through a body of a person, with a portable PAN transceiving device for communication of near-field electric field signals therebetween;

transmitting during said communication to said first PAN transceiving device data identifying an associated telephone network subscriber including speech recognition templates unique to said subscriber and network services to which said subscriber is authorized, from said portable PAN transceiving device;

transferring said data from said telephone station through a network switch to a control processor in a telephone communications network for temporary storage therein; and processing the call under pursuant said control processor in dependence upon the network services data and the stored speech recognition templates.

7. A method as recited in claim 6, wherein said processing step comprises:

obtaining input from said telephone station for placing the call;

comparing an utterance spoken by a person at said telephone station with said stored speech templates to verify the identity of the person as said subscriber;

in response to verification in said comparing step, accessing the subscriber's stored network services data; and completing the call in accordance with the obtained input and the accessed network services data.

8. A method as recited in claim 7, wherein said input comprises DTMF signals.

9. A method as recited in claim 7, wherein said input comprises spoken speech signals and further comprising the step of performing speech recognition of the spoken speech signals using said stored speech recognition templates.

* * * * *